Figure 1:
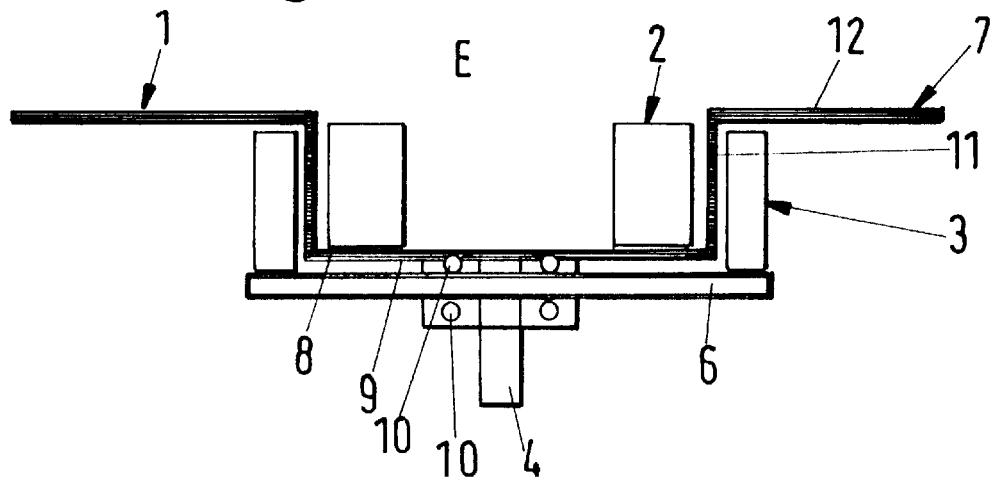

United States Patent
Roth

[19]

[11] Patent Number: 6,126,417
[45] Date of Patent: Oct. 3, 2000

[54] CONVEYING DEVICE FOR LIQUID AND GASEOUS MEDIA, SUCH AS VACUUM CLEANERS, PUMPS ETC.

[75] Inventor: Paul Roth, Isny, Germany

[73] Assignee: PROAIR GmbH Gerätebau, Germany

[21] Appl. No.: 09/073,008

[22] Filed: May 5, 1998

[30] Foreign Application Priority Data

May 5, 1997 [DE] Germany ............................. 197 18 981

[51] Int. Cl.[7] ................................................. F04B 17/03
[52] U.S. Cl. .................................. 417/423.7; 417/423.11; 417/423.2
[58] Field of Search ............................... 417/423.7, 420, 417/423.11, 423.14, 313, 423.2

[56] References Cited

U.S. PATENT DOCUMENTS

| | | | |
|---|---|---|---|
| 4,752,194 | 6/1988 | Wienen et al. .......................... | 417/420 |
| 4,998,863 | 3/1991 | Klaus ........................................ | 417/63 |
| 5,066,200 | 11/1991 | Ooka ......................................... | 417/63 |
| 5,297,940 | 3/1994 | Buse .......................................... | 417/63 |
| 5,332,374 | 7/1994 | Kricker et al. ........................... | 417/420 |
| 5,368,439 | 11/1994 | Piazza ...................................... | 415/131 |
| 5,501,582 | 3/1996 | Gautier et al. ........................... | 417/420 |
| 5,567,132 | 10/1996 | Dupuis et al. ............................ | 417/420 |

*Primary Examiner*—Charles G. Freay
*Assistant Examiner*—Robert Z. Evora
*Attorney, Agent, or Firm*—Robert W. Becker & Associates

[57] ABSTRACT

A conveying device for liquid and gaseous media has a drive unit with a drive shaft. At least one rotating component is connected to the drive shaft. At least one stationary component is coordinated with the at least one rotating component. A separating member for separating the at least one rotating component from the at least one stationary component is provided. The separating member consists of an electrically non-conducting material.

10 Claims, 4 Drawing Sheets

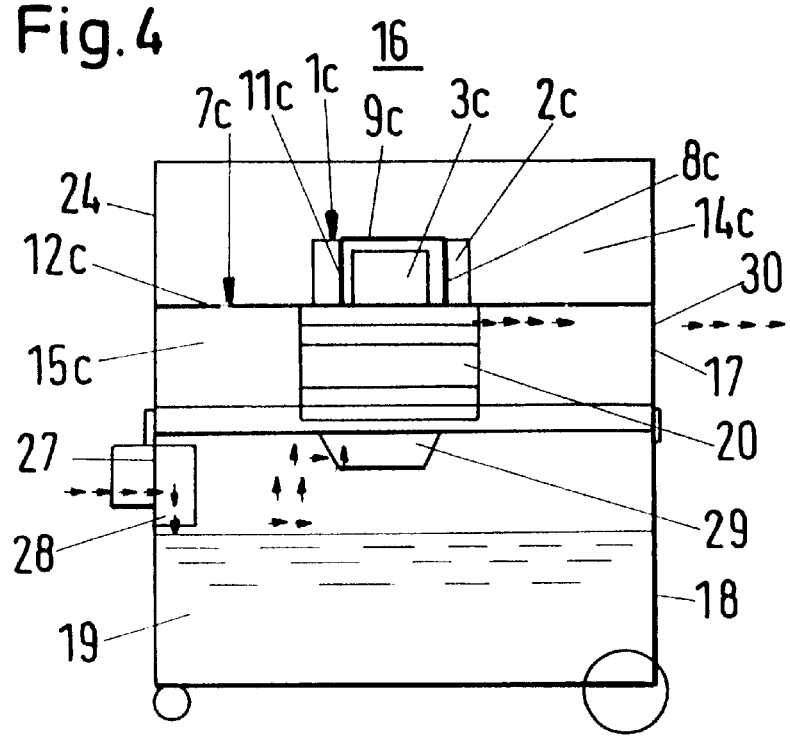
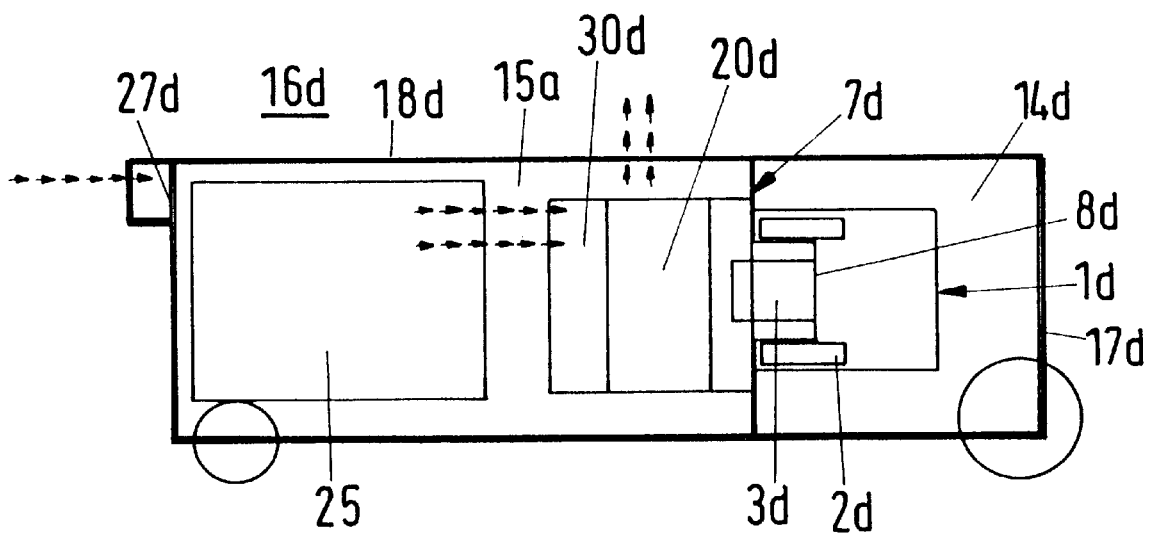

CONVEYING DEVICE FOR LIQUID AND GASEOUS MEDIA, SUCH AS VACUUM CLEANERS, PUMPS ETC.

BACKGROUND OF THE INVENTION

The present invention relates to a conveying device for liquid and gaseous media, such as vacuum cleaners, pumps etc., comprising a drive unit, preferably including an electric motor, having a drive shaft on which at least one rotating component, preferably a rotor, is securely fastened and has at least one stationary, especially electrical component coordinated therewith.

In wet-pickup vacuum cleaning devices or devices comprising a water-based filter system, it is common to use electric motors that are connected to a suction blower. The suction blower produces the required vacuum in order to perform the desired suction work. It is disadvantageous that the suction air is guided through the motor and in this manner moisture and fine dust particles can soil the interior of the motor which may result in damage to the motor. Furthermore, in such electrical devices that are exposed to water, considerable expenditures are required in order to prevent exposure of the current-carrying or electrical/electronic components to moisture, respectively, in order to fulfill the specifications which are imposed with regard to device safety.

Conveying devices for gaseous media have drive units that are positive-lockingly connected to the conveying part. When explosive gases are to be conveyed, very high requirements with regard to device safety must be fulfilled, especially within the sealing areas.

It is therefore an object of the present invention to embody a conveying device of the aforementioned kind such that in a constructively simple manner a reliable separation of the rotating components required for conveying the media relative to the stationary component is provided.

SUMMARY OF THE INVENTION

A conveying device for liquid and gaseous media according to the present invention is primarily characterized by:

- a drive unit comprising a drive shaft;
- at least one rotating component connected to the drive shaft;
- at least one stationary component coordinated with the at least one rotating component;
- a separating member for separating the at least one rotating component from the at least one stationary component;
- wherein the separating member consists of an electrically non-conducting material:
  - the separating member is preferably partition.

The separating member extends preferably through the drive unit.

Advantageously, the conveying device comprises a housing wherein the separating member is a part of the housing.

The electrically non-conducting material is advantageously a plastic material.

The rotating component may be a blower part.

The separating member comprises a cup-shaped part in which the at least one rotating component or the at least one stationary component is positioned.

The cup-shaped part is preferably integrally formed at the separating member.

The drive unit is advantageously an electric motor without commutators.

The conveying device may comprise a pump wheel seated on the drive shaft or seated on the at least one rotating part.

Due to the inventive embodiment the rotating and the stationary components are spacially separated from one another so that these components no longer intermesh or are no longer provided as a module. With the inventive spacial separation the rotating component is completely separated from the stationary component so that no additional expenditures, for example, for electrical safety by insulation or sealing measures relative to explosive media or for fulfilling government regulations, must be provided. For example, the current-guiding and the non-current guiding components can thus be respectively positioned in the chambers separated by the separating member.

BRIEF DESCRIPTION OF THE DRAWINGS

The object and advantages of the present invention will appear more clearly from the following specification in conjunction with the accompanying drawings, in which:

FIG. 1 is a schematic representation of a drive unit in the form of an electric motor for the inventive conveying device;

FIG. 2 shows a further embodiment of the electric motor in a schematic representation;

FIG. 3 shows the electric motor of FIG. 1 which is positioned in a housing part of the device housing;

FIG. 4 shows in a schematic representation a conveying device with electric motor and a water-based filter system;

FIG. 5 shows in a schematic representation the conveying device of the present invention as a vacuum cleaner with a further embodiment of the electric motor;

FIG. 6 is a schematic representation of a further embodiment of the drive unit of the inventive conveying device;

FIG. 7 shows in a schematic representation the inventive conveying device embodied as a pump;

FIG. 8 shows in a schematic representation a further embodiment of the conveying device as a pump;

FIG. 9 is an axial section of the inventive conveying device in the form of a vacuum device with water-based filter.

DESCRIPTION OF PREFERRED EMBODIMENTS

The present invention will now be described in detail with the aid of several specific embodiments utilizing FIGS. 1 through 9.

FIG. 1 shows an electric motor of a conveying device comprising a stator 2, which in a manner known per se is comprised of a non-represented lamella package with windings. The stator 2 is surrounded by a rotor 3 which is in the form of an external rotor and is connected to the edge of a disc-shaped support 6. It is fixedly seated on a drive shaft 4 to which the conveying means is connected. In order to separate the stator 2, i.e., the electric side E of the motor, from the rotor 3, a separating member in the form of a partition 7 is provided which extends between the stator 2 and the rotor 3. The separating member or partition 7 surrounds the stator 2 with a cup-shaped part 8 that with its bottom 9 is positioned at a distance from the support 6. A cylindrical wall 11 of the cup-shaped part 8 is positioned at a spacing from the stator 2 and with a preferably smaller spacing from the rotor 3. At a distance above the rotor 3 the cup-shaped part 8 comprises a wall portion 12 that extends parallel to the bottom 9 which separates the rotor 3 from the electrical side E. The drive shaft 4 is supported rotatably by two ball bearings 10 which are supported by the support 6.

The partition 7 is comprised of an electrically non-conducting material, preferably plastic. The partition 7 separates the stator 2 form the rotor 3 in a constructively very simple manner and provides complete electrical insulation so that the complicated and expensive insulation measures and measures for fulfilling government regulations for electrical devices required for conventional electric motors are eliminated. Due to the complete separation of the current-carrying parts (stator 2) from the non-current carrying parts (rotor 3) an excellent protection of the stator with regard to exposure to moisture is ensured. Thus, the motor 1 is especially suitable for conveying devices in which the motor 1 can be exposed to moisture or liquid, such as, for example wet-pickup vacuum cleaning devices or devices with a water-based filter system. Otherwise, the electric motor 1 is of the same construction as conventional electric motors.

Figure 2:
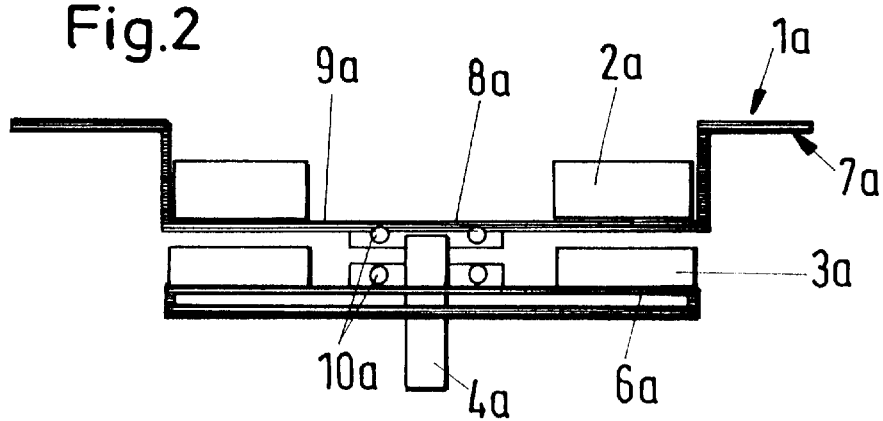

FIG. 2 shows a disc motor 1a in which the stator 2a and the rotor 3a are arranged on the drive shaft 4a at an axial spacing and are embodied as flat 3a, annular discs. The rotor 3a is arranged on the support 6a which is fixedly connected to the drive shaft 4a supported by bearings 10a in a rotatable manner. The bearings 10a are positioned in the area between the support 6a and the bottom 9a of the partition 7a which is embodied in the same manner as in the previous embodiment. The rotor 3a is thus spacially separated from the stator 2a by the partition 7a. In contrast to the embodiment disclosed above 3a, the drive shaft penetrates the support 6a. In analogy to the embodiment according to FIG. 1, the stator 2a can be fastened to the bottom 9a of the partition 7a. The stator 2a and the rotor 3a are separated by the planar bottom 9a of the partition 7a. As in the above disclosed embodiment, that stator 2a is positioned within the cup-shaped part 8a of the partition 7a.

Figure 3:
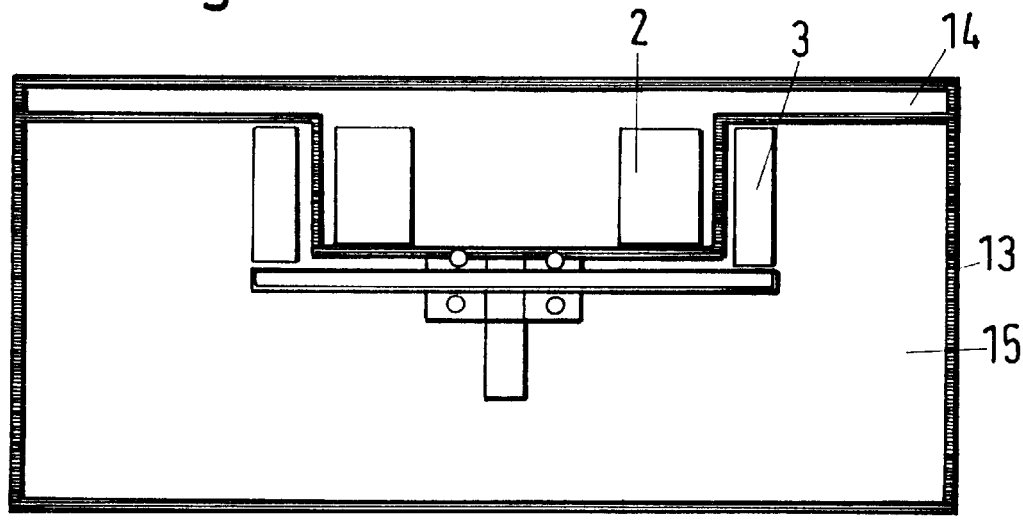

As can be seen in FIG. 3, the partition 7 can be embodied as a unitary part of the housing part 13 of the conveying device, for example, a vacuum cleaner comprising a water-based filter system or a conventional vacuum cleaner. Accordingly, the stator 2 can be housed in a protected manner in the housing chamber 14 above the partition and the rotor 3 can be positioned in a protected manner in the chamber 15 underneath. The unitary embodiment of the partition 7 with the housing part 13 thus does not require a separate device component so that the weight of the conveying device is not increased by a substantial amount. The disclosed embodiment of the partition within the housing part 13 ensures an absolute safety of the motor with respect to accidental suction of water into the motor when using a water-based filter system. Furthermore, soiling of the electronic motor components is reliably prevented.

The disclosed electric motor can also be embodied such that the rotor is a component of a pump or a blower of the conveying device in which the motor is arranged. (FIGS. 4, 5).

FIG. 4 shows in a schematic representation a vacuum cleaner with a water-based filter system as a conveying device. The conveying device comprises a housing 1, 18 in which the water-based filter system 19, a blower 20, a stator 2c and a rotor 3c are housed. The water-based filter system 19 is arranged in the bottom part of the housing 17, 18, and the blower 20, the rotor 3c, and the stator 2d are positioned in the upper housing part 17. The bottom part 18 of the housing has a suction opening 27 to which is connected a non-represented suction hose. Connected to the suction opening 27 is a downwardly extending socket 28 through which the dirty air, entering in the direction of the shown arrows, is guided into the water-based filter system 19 (water bath). The suction air is produced in a manner known per se by the blower 20. The dirt particles contained in the intake air are retained in the water. After passing through the water-based filter 19, the air is introduced into the separator 29 which is fixedly connected to the lower end of the non-represented drive shaft of the electric motor. In the separator 29 the separation of dirt and dust particles as well as water droplets is achieved in a manner known per se by centrifugal forces. The thus cleaned air flows through the blower 20 and exits from the vacuum cleaner 16. As indicated by the flow arrows in FIG. 4, the air exits below the separation member (partition) 7c from the blower 20 before it is guided through the outlet opening 30 below the partition 7c into the surrounding air.

The rotor 3c of the electric motor is seated on the upper end of the drive shaft and is positioned within the cup-shaped part 8c provided at the partition 7c. The cup-shaped part 8c is advantageously a unitary part of the partition 7c that separates the upper housing part 17 into two separate chambers 14c and 15c. The rotor 3c is surrounded at a spacing by the stator 2c which is positioned external to the cup-shaped part 8c in the chamber 14c. In this chamber 14c the non-represented electric/electronic control of the motor 1c is positioned. The rotor 3c and the stator 2c are spacially separated from one another by the partition 7c. The partition 7c can be a unitary part of the upper housing part 17 and can be comprised of a non-conductive material, preferably plastic, but also may be provided as a separate element that is fastened in a suitable manner to the upper housing part 17. The partition 7c is connected with its edge 12c to the sidewalls 24 of the upper housing part 17. The cup-shaped part 8c surrounds the rotor 3c with play and covers it with its bottom 9c relative to the chamber 14c. The stator 2c surrounds at a small spacing the wall 11c of the cup-shaped part 8c. In the chamber 14c the current-carrying stator 2c is positioned. It is completely separated from the non-current carrying parts of the vacuum cleaner 16. The partition 7c extends directly through the electric motor 1c. The spacial separation of the rotor 3c and of the stator 2c by the partition 7c prevents in a simple manner that moisture or liquid contained in the air sucked in the blower 20 can reach the current-carrying stator 2c. A soiling of the interior of the motor and damage to the motor 1c are thus also reliably prevented.

Since the partition 7c is advantageously a part of the device housing 17, 18, it is possible in a simple and inexpensive manner to provide an insulation of the non-current carrying motor components (rotor 3c) from the stationary current-carrying motor components (stator 2c). This allows fulfilling the safety requirements for conventional electric motors without additional complicated measures.

FIG. 5 shows a conveying device in the form of a vacuum cleaner 16d in which behind the suction opening 27d a dust collecting bag 25 is arranged. The suction air is generated by the blower 20d which is positioned in the chamber 15d of the housing 17d, 18d and which comprises the rotor 3d. The air containing dust is axially sucked in by the blower 20d and is radially outwardly blown out through the outlet opening 30d in the wall of the housing part 18d. The chamber 15d in which the blower 20d and the rotor 3d are positioned is separated by the partition 7d from the chamber 14d. The partition 7d extends, as in the previously described embodiment, through the motor 1d and is advantageously formed by a housing part of the vacuum cleaner housing 17d, 18d. The rotor 3d is arranged in the cup-shaped part 8d of the partition 7d. The stator 2d which is positioned in the chamber 14d surrounds the housing part 8d at a spacing. The axes of the blower 20d, the rotor 3d, and the stator 2d are horizontally arranged while in the embodiment disclosed above they are arranged vertically.

In the chamber 14d, delimited by the partition 7d and the housing part 17d, the stator 2d is protected against moisture and soiling. As in the embodiment disclosed above, the partition 7d extends directly through the motor 1d. When the partition 7d is part of the housing 17d, 18d, only a few components are required for the vacuum cleaner 16d. It therefore has only a minimal weight.

Figure 6:
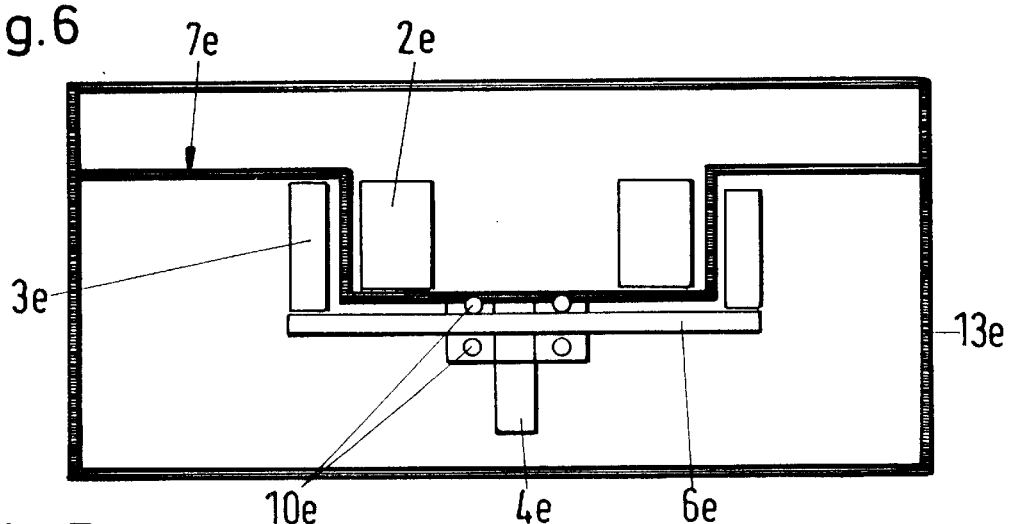

FIG. 6 shows an electrical motor for a conveying device such as a pump. With this conveying device liquid materials can be conveyed. The drive shaft 4e serves as a connector to the conveying means such as a container pump. The support 6e is fixedly connected to the drive shaft 4d which, according to the embodiments of FIGS. 1 through 3, is disc shaped and extends perpendicularly to the drive shaft 4e. The rotating components 3e are connected to the circumference of the support 6e and surround at a distance electric components 2e which are fixedly connected to the housing. The components 2e and 3e may be the stator and rotor of an electric motor. The electrical and the rotating components 2e, 3e are separated by the partition 7e, i.e., the partition 7e extends between the two units 2e and 3e. Accordingly, the electric components 2e of the motor are separated from the rotating components 3e. This increases the device safety with minimal expenditure to the maximum level and the accident risk in regard to the electric components 2e is reduced to the greatest possible extent.

The partition 7e is identical to that as in the embodiment of FIG. 3. The partition 7e is a unitary part of the housing part 13e of the conveying device. The drive shaft 4e is supported by bearings 10e in a rotatable manner.

The conveying means can be force-lockingly connected to the electric motor by flanging. The rotating part 3e may also be a part of the conveying device such as a blower or a pump. The drive unit can be used especially suitably for conveying explosive materials. The partition 7e separates the electric components 2e absolutely reliably from the rotating components 3e so that a possible spark generation in the area of the electric components 2e cannot result in explosion of the explosive materials which are present within the area below the partition 7e. The partition 7e has no perforations so that sealing problems as are known from conventional conveying devices are not present. The electrical safety without perforations of the partition 7e is thus ensured with minimal expenditure. Especially for wet-pickup vacuum devices, which convey water and air, this embodiment ensures a great amount of safety. An optimal explosion protection is provided whereby the manufacturing costs are minimal.

Figure 7:
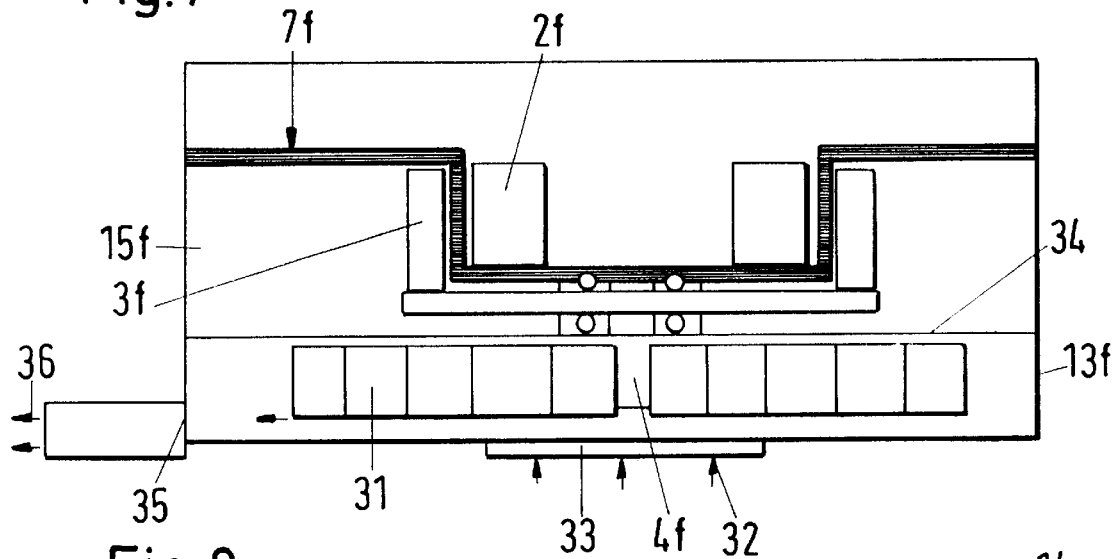

FIG. 7 shows a further embodiment of the drive unit for a conveying device which in the shown embodiment is a pump. A pump wheel 31 is fixedly connected to the drive shaft 4f and the medium to be pumped is sucked in via an inlet opening 33 provided within the housing part 13f in the direction of arrows 32. The pump wheel 31 is positioned below the dividing wall 34 which divides the chamber 15f below the partition 7f. The dividing wall 34 is penetrated by the drive shaft 4f. The medium to be conveyed is conveyed by the pump wheel 31 radially outwardly through an outlet opening 35 of the housing part 13f in the direction of arrows 36.

Above the dividing wall 34 the drive unit, in the form of an electric motor, is positioned which is identically constructed as in the embodiment according to FIG. 6. The housing part 13f forms the pump housing in which the drive motor with electric components 2f, the partition 7f, and the rotating component 3f are arranged.

Figure 8:
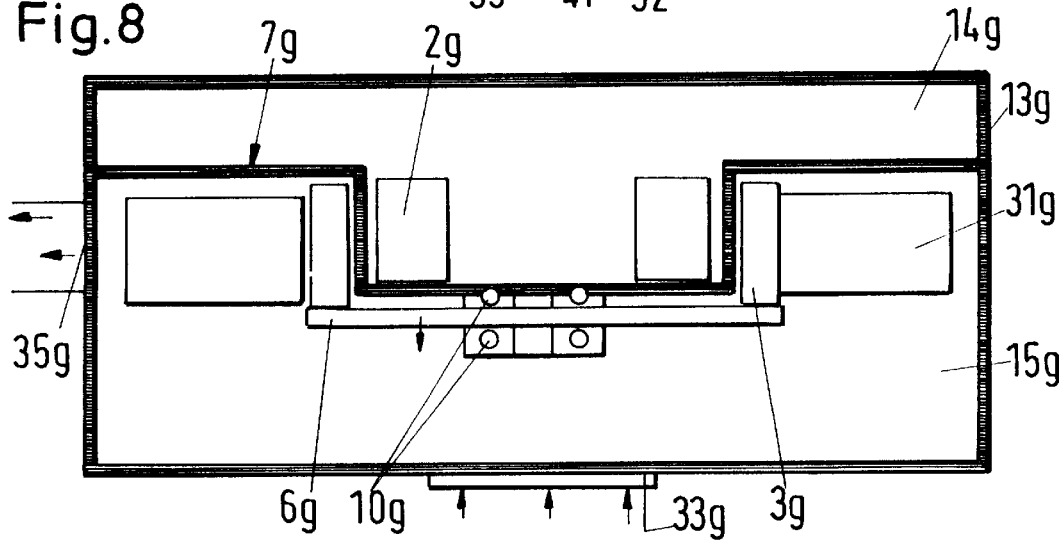

In the embodiment according to FIG. 8 the pump wheel is positioned on the rotor 3g. That surrounds the stator 2g at a spacing. The rotor 3g is positioned at the circumference of the support 6g which is supported by bearings 10g rotatably at the pump housing 13g. The stator 2g is separated by partition 7g completely from the rotor 3g. The partition is arranged in the same manner as in the previous embodiment. The pump housing 13g has an inlet opening 33g as well as an outlet opening 35g. The pump housing 13g is divided by the partition 7g into two housing chambers 14g and 15g which are completely separated from one another by the partition 7g. The pump wheel 31g with the rotor 3g, the support 6g, and the bearing 10g are housed within the housing chamber 15g. Otherwise, this embodiment is identical to the embodiment of the FIG. 7.

Figure 9:
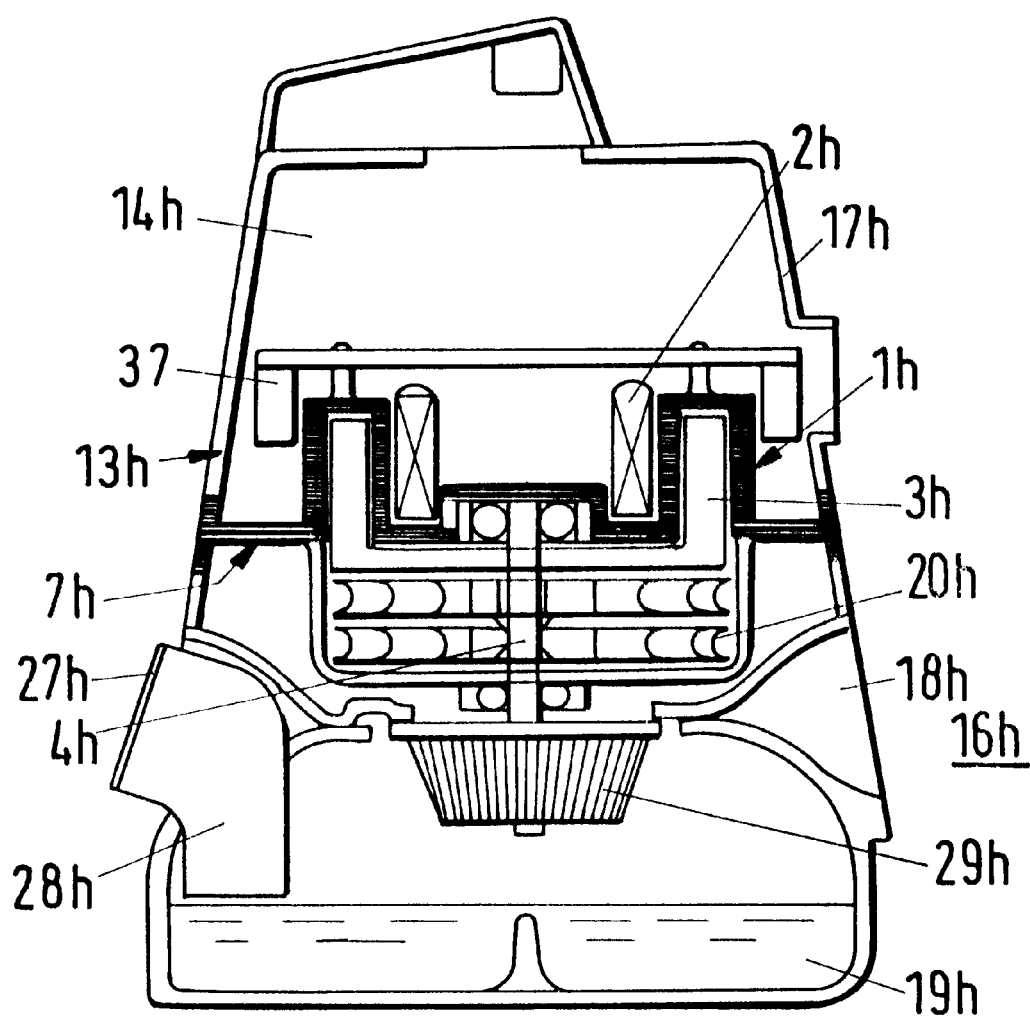

FIG. 9 shows a conveying device in the form of a vacuum cleaner 16h with a water-based filter system. The conveying device includes housing 17h, 18h. In the bottom part 18h of the housing the suction opening 27 is provided to which is connected a non-represented suction hose. An inwardly oriented socket 28h is connected to the suction opening 27 through which the soiled air sucked in by the blower is guided into a non-represented water-bath. The suction air is produced in a manner known per se by the blower 20h. The water bath retains the dirt particles of the incoming air. The clean air, after leaving the water bath, enters the blower 20h which, depending on the design of the vacuum cleaner 16h, may be provided at the lower end with a separator. The blower is seated fixedly on the drive shaft 4h of the electric motor 1h. The clean air flows through the blower 20 and exits the vacuum cleaner 16h in a manner known per se.

The electric motor 1h has stator 2h which is surrounded at a spacing by the rotor 3h. The stator 2h and the rotor 3h are completely separated from one another by partition 7h which extends through the electric motor 1h such that the electric parts 2h of the electric motor are separated from the rotating components 3h, 20h. The cross-sectional embodiment of the partition 7h is adapted to the constructive design of the electric motor 1h. In the chamber 14h further electronic or electric components, for example, capacitors 37 are positioned in addition to the stator 2h. Accordingly, the partition 7h is shaped such that further electric and/or electronic components 37 can be separated from the rotating components 3h, 20h. The partition 7h, comprised of thin material, can be easily shaped as desired so that it can be arranged with minimal manufacturing expenditure within the housing 13h such that it completely separates the current-carrying components from the rotating components.

In all embodiments the partition 7, 7a, 7c, 7d through 7h is designed such that the stator 2, 2a, 2c, 2d through 2h cooperate with the rotor 3, 3a, 3c, 3d through 3h. With the disclosed spacial separation it is reliably and simply prevented that the electronic components can become soiled and/or can come in contact with moisture. The motor 1a, 1c, 1d, 1h is an electronically commutated motor which does not exhibit the disadvantages of commutator motors such as carbon deposits, track currents etc. It operates extremely silently because it has no commutator, has only a minimal heat development an requires no servicing. Furthermore, it has a stable rpm, high torque, excellent efficiency, high precision and a minimal number of components. The commutator-free electric motor 1, 1*a*, 1*c*, 1*d*, 1*h* is free of wear and has a minimal weight. In the preferred use of this electric motor in a vacuum cleaner with water-based filter system, the amount of water can be increased and thus the cleaning efficiency can be increased by almost 50%. The reduced weight also facilitates manipulation of the device. The conventional parts such as carbon brushes of a commutator motor are no longer needed so that the amount of electric smog is reduced.

Instead of the disclosed electric motors the drive unit can also be a magnetic drive in which the force transmission is achieved by magnetic forces. In such an embodiment, the stationary part is separated from the rotating part by the partition which extends between the two components. The conveying device can be used for liquid or for gaseous media.

The partition can be shaped differently in a simple manner so that the design of the partition can be adapted easily to the different requirements with regard to mounting space of the drive units.

The specification incorporates by reference the disclosure of German priority document 197 18 981.4 of May 5, 1997.

The present invention is, of course, in no way restricted to the specific disclosure of the specification and drawings, but also encompasses any modifications within the scope of the appended claims.

What is claimed is:

1. A conveying device for liquid and gaseous media, said device comprising:

a drive unit comprising a drive shaft;

a tank for holding a liquid filter system;

a suction opening by which dirty air is suctioned into said device, said dirty air conveyed through said liquid filter system and on to a separator, said separator disposed on said drive shaft and downstream from a blower;

at least one rotating component connected to said drive shaft;

at least one stationary component coordinated with at least one rotating component, said at least one rotating component coaxially arranged relative to said at least one stationary component;

a partition member for separating said at least one rotating component from said at least one stationary component, wherein said partition member consists of an electrically non-conducting material and wherein said partition member defines a first chamber and a second chamber, said first chamber containing said blower, said separator and said at least one rotating component and said second chamber containing said stationary component; and an outlet disposed downstream of said blower for releasing cleaned air from said device.

2. A conveying device according to claim 1, wherein said partition member extends through said drive unit.

3. A conveying device according to claim 1, comprising a housing, wherein said partition member is a part of said housing.

4. A conveying device according to claim 1, wherein said electrically non-conducting material is a plastic material.

5. A conveying device according to claim 1, wherein said rotating component is a blower part.

6. A conveying device according to claim 1, wherein said partition member comprises a cup-shaped part in which said at least one rotating component or said at least one stationary component is positioned.

7. A conveying device according to claim 6, wherein said cup-shaped part is integrally formed in said partition member.

8. A conveying device according to claim 1, wherein said drive unit is an electric motor without commutator.

9. A conveying device according to claim 1, comprising a pump wheel seated on said drive shaft.

10. A conveying device according to claim 1, comprising a pump wheel seated on said at least one rotating part.

* * * * *